(12) United States Patent
Brown et al.

(10) Patent No.: US 6,409,155 B1
(45) Date of Patent: Jun. 25, 2002

(54) METHOD OF INSERTING A LIGHT TRANSMITTING MEMBER INTO A TUBE

(75) Inventors: George Henry Platt Brown, Galashiels; Steven King, Kelso, both of (GB)

(73) Assignee: Emtelle UK Limited (GB)

( * ) Notice: Subject to any disclaimer, the term of this patent is extended or adjusted under 35 U.S.C. 154(b) by 0 days.

(21) Appl. No.: 09/582,550

(22) PCT Filed: Dec. 7, 1998

(86) PCT No.: PCT/GB98/03643
§ 371 (c)(1),
(2), (4) Date: Jun. 27, 2000

(87) PCT Pub. No.: WO99/35525
PCT Pub. Date: Jul. 15, 1999

(30) Foreign Application Priority Data

Dec. 30, 1997 (GB) .............................................. 9727411
Jan. 7, 1998 (GB) .............................................. 9800144

(51) Int. Cl.[7] .............................................. B65H 59/00
(52) U.S. Cl. .............................. 254/134.4; 254/134.3 R
(58) Field of Search ....................... 254/134.3, 134.3 R, 254/134.3 FT (56) References Cited

U.S. PATENT DOCUMENTS

| 4,582,297 | A | * | 4/1986 | Conti ....................... 254/134.4 |
| 5,143,353 | A | * | 9/1992 | Sano et al. ............... 254/134.4 |
| 5,308,041 | A | * | 5/1994 | Griffioen et al. ......... 254/134.4 |
| 5,467,968 | A | * | 11/1995 | Proud et al. ............. 254/134.4 |
| 5,499,797 | A | * | 3/1996 | Sano et al. ............... 254/134.4 |
| 5,950,298 | A | * | 9/1999 | Griffioen et al. ......... 254/134.4 |

FOREIGN PATENT DOCUMENTS

GB     wo-97/03376    *   1/1997  ............ G02B/6/50

* cited by examiner

Primary Examiner—Joseph J. Hail, III
Assistant Examiner—Lee Wilson
(74) Attorney, Agent, or Firm—Brinks, Hofer, Gilson & Lione (57) ABSTRACT

A method of inserting an unreinforced fiber optic member into a duct is disclosed. An elongate, flexible pull cord is inserted into the duct and is attached adjacent its rearward end to the fiber optic member adjacent a forward end thereof. The forward end of the fiber optic member is then introduced into the duct, and fluid such as air is caused to flow along the duct to cause the pull cord and fiber optic member to move into the duct.

21 Claims, 6 Drawing Sheets

METHOD OF INSERTING A LIGHT TRANSMITTING MEMBER INTO A TUBE

CROSS-REFERENCE TO RELATED APPLICATIONS

PCT/GB98/03643 Dec. 07, 1998; United Kingdom 9800144.9 Jan. 07, 1998 United Kingdom 9727411.2 Dec. 30, 1997.

CLAIM FOR PRIORITY

This patent application claims priority under 35 U.S.C. §365 from International Application Serial No. PCT/GB98/03643, filed Dec. 7, 1998, which claims priority from United Kingdom Application Serial No. 972711.2, filed Dec. 30, 1997, and United Kingdom Application Serial No. 9800144.9, filed on Jan. 7, 1998, which applications are incorporated herein by reference for all purposes.

FIELD OF THE INVENTION

The present invention relates to a method for inserting an elongate, flexible light transmitting member into a tube, and relates particularly, but not exclusively, to a method for inserting one or more optical fibres into a tube.

BACKGROUND OF THE INVENTION

EP 0108590 discloses a method of installing an optical fibre member into a duct by causing air flow along the duct such that the fluid drag between the flowing air and the optical fibre member moves the fibre member along the duct. The fibre member is pushed into the duct by means of drive wheels until the surface area of the fibre member exposed to the air flow is sufficiently large to enable the fluid drag to pull the fibre member along the duct to install it in the duct.

The drive wheels are used to address problems caused by the compressibility of air entering the duct. Because of the compressibility of air, the pressure difference necessary between the ends of the duct to install a long length of fibre into the duct causes the flow rate of the air at the input end of the duct to be considerably less than at the output end. As a result, the fluid drag at the input end is often insufficient to draw the fibre member into the duct. Without the drive wheels, the air pressure may even cause the fibre member to move out of the input end of the duct. The drive wheels push the fibre into the duct until a sufficient length of fibre is in the duct to enable the fluid drag to cause the fibre to move along the duct.

However, the extent to which this problem can be overcome with this prior art method is limited, since the optical fibre has a tendency to buckle in the duct, with the result that the fibre may become wedged. It is therefore necessary to employ sophisticated electronic devices to detect buckling of the fibre and stop the drive mechanism in response to this. In addition, it is extremely difficult to install fibre into a longer duct comprising a series of lengths of duct by arranging such prior art devices in series such that each device blows the fibre along a length of duct corresponding to the maximum distance along which the fibre can be blown by a single device. This problem mainly arises because it is extremely difficult to coordinate the installation speed of two such devices which may be separated by up to 2000 meters, as a result of which damage to the fibre may arise.

JP-A-63-124005 discloses a method of installing a reinforced fibre optic cable into a duct by attaching tensile force fibres to the forward end of the fibre optic cable, and blowing the cable into the duct while simultaneously pulling the tensile force fibres from the opposite end of the duct. However, this arrangement suffers from the drawback that if any bends occur in the duct (a frequent occurrence in practical arrangements), applying tension to the tensile force fibres and the fibre optic cable brings the fibres and the cable into contact with the inner wall of the duct, thus causing a frictional force between the tensile force fibres and/or the fibre optic cable and the wall of the duct. This can often greatly increase the tensile force needed to be applied to the tensile force fibres, which can easily damage the fibre optic cable unless the cable has substantial tensile reinforcement. As a result, this arrangement is wholly unsuitable for use with unreinforced or lightly reinforced fibre optic cables.

Preferred embodiments of the present invention seek to overcome the above disadvantages of the prior art.

BRIEF SUMMARY OF THE INVENTION

According to an aspect of the present invention, there is provided a method of inserting an elongate, flexible, light transmitting member into an elongate tube, the method comprising:

inserting an elongate, flexible, tensile member into the tube;

inserting an elongate, flexible, tensile member into the tube;

attaching the tensile member adjacent a rearward end thereof to the light transmitting member adjacent a forward end thereof;

introducing the forward end of the light transmitting member into the tube; and causing flow of fluid along the tube to cause the tensile member to move along the tube and the light transmitting member to move into the tube, wherein the tensile member in use, is caused to move along the tube solely by said flow of fluid.

By attaching a tensile member, the other end of which is not pulled, to the forward end of the light transmitting member, the fluid flow along the tube tends to locate the tensile member towards the axial centre of the tube. The fluid drag between the moving fluid and the tensile member causes the tensile member to move along the tube, but minimises the tendency of the tensile member to come into contact with the walls of the tube. This in turn applies a forward force to the forward end of the light transmitting member, which assists the fluid drag between the fluid and the light transmitting member in moving the light transmitting member along the tube, but without the necessity of applying excessive tension to the tensile member which may otherwise damage the light transmitting member. This provides the advantage of enabling the method to be used to install unreinforced or lightly reinforced fibre optic members. The method also has the advantage of enabling significantly longer installation distances than are achievable with prior art methods.

The fluid preferably comprises air and/or pressurised gas. Alternatively, the fluid may be a liquid, for example water.

In a preferred embodiment, the tensile member is inserted into the tube prior to positioning of the tube at a location at which the light transmitting member is to be inserted therein.

This provides the advantage of avoiding the necessity of installing the tensile member in the tube on site, i.e. at the location at which the light transmitting member is to be installed.

The tensile member is preferably installed in the tube during manufacture thereof.

The tensile member may be attached at one end thereof to a plug adapted to fit in an end of the tube.

This provides the advantage of facilitating location of the end of the tensile member prior to use.

The forward end of the light transmitting member may be introduced into the tube by means of control means for controlling the speed of the light transmitting member.

The forward end of the light transmitting member may be introduced into the tube by means of a drive mechanism.

This provides the advantage of enabling control of the rate of installation of the light transmitting member by virtue of setting the drive mechanism to introduce the light transmitting member at a lower rate than would otherwise occur as a result of fluid drag alone.

The method preferably further comprises the step of controlling the speed of the light transmitting member in response to slackness in the light transmitting member.

This provides the advantage of avoiding situations in which the light transmitting member is fed into the tube faster than the rate at which the fluid drag is carrying the member along the tube, which would cause the light transmitting member to buckle and become damaged.

The tensile member preferably has a relatively low coefficient of friction with the internal wall of the tube.

In a preferred embodiment, the tensile member comprises fibres coated with a low friction material.

The tensile member may have a relatively high coefficient of fluid drag with the flowing fluid in the tube.

In a preferred embodiment, the tensile member is rotationally symmetrical.

This provides the advantage of minimising rotary movement of the tensile member, which may otherwise tend to bring the tensile member into contact with the wall of the tube, thus introducing frictional resistance.

According to another aspect of the invention, there is provided a method of inserting an elongate, flexible, light transmitting member into a plurality of elongate tubes arranged in series, the method comprising:

(a) inserting the light transmitting member into a first length of tube;

(b) feeding the forward end of the light transmitting member through a connector having a first inlet for sealingly receiving a forward end of the first length of tube, a first outlet for allowing escape of fluid flowing along said first length of tube, a second inlet for allowing entry of fluid flowing along a further length of tube, and a second outlet for sealingly receiving a rearward end of the further length of tube;

(c) connecting the forward end of the first length of tube to the first inlet and the rearward end of the further length of tube to the second outlet; and (d) inserting the light transmitting member into the further length of tube by means of a method as defined above.

Because the light transmitting member is connected adjacent a forward end thereof to a tensile member during insertion into each length of tube, fluid flow in the further length of tube causes a forward tension to be applied to the light transmitting member in the connector, which overcomes any tendency for fluid flow in the first or further length of tube to cause the light transmitting member to move out of the connector in the rearward direction. This therefore provides the advantage that drive means is no longer required for inserting the light transmitting member into each length of tube at the input end thereof, with the result that installation speeds between successive drive means do not need to be coordinated, and damage to the light transmitting member is thus avoided.

In addition, because drive means are no longer necessary, the connector can have a much more compact and lightweight construction than prior art connectors.

The method preferably further comprises inserting the light transmitting member into a plurality of further lengths of tube by repeating steps (b) to (d) for each further length of tube.

In a preferred embodiment, a respective tensile member is inserted into each length of tube prior to positioning of the tube at the location at which the light transmitting member is to be inserted therein, and the method further comprises the step of detaching the tensile member of the first length of tube from the light transmitting member after installation thereof in the first length of tube, and attaching the tensile member of the or each further length of tube to the light transmitting member subsequently to feeding of the forward end thereof through the or each connector.

The or each connector may comprise at least two parts to facilitate removal thereof from the first and further lengths of tube.

Alternatively, the method may comprise the step of sealing the first outlet and second inlet of the or each connector subsequently to insertion of the light transmitting member.

This provides the advantage of preventing penetration of moisture or dirt into the or each connector.

The or each connector preferably further comprises an aperture so sized as to permit movement of the light transmitting member from the first inlet to the second outlet, but not passage of fluid from the second inlet to the first outlet.

In a preferred embodiment, the tensile member has a weight per unit length less than that of the light transmitting member.

This has the advantage that the tensile member tends to move along the tube more rapidly than the light transmitting member, as a result of which the tensile/light transmitting member combination in the further length of tube has a tendency to move along the tube more rapidly than the light transmitting member in the first length of tube. This in turn provides the advantage of avoiding buckling of, and consequent damage to, the light transmitting member.

The light transmitting member preferably comprises one or more optical fibres.

A preferred embodiment of the invention will now be described, by way of example only and not in any limitative sense, with reference to the accompanying drawings in which:

DETAILED DESCRIPTION OF THE INVENTION

Figure 2:
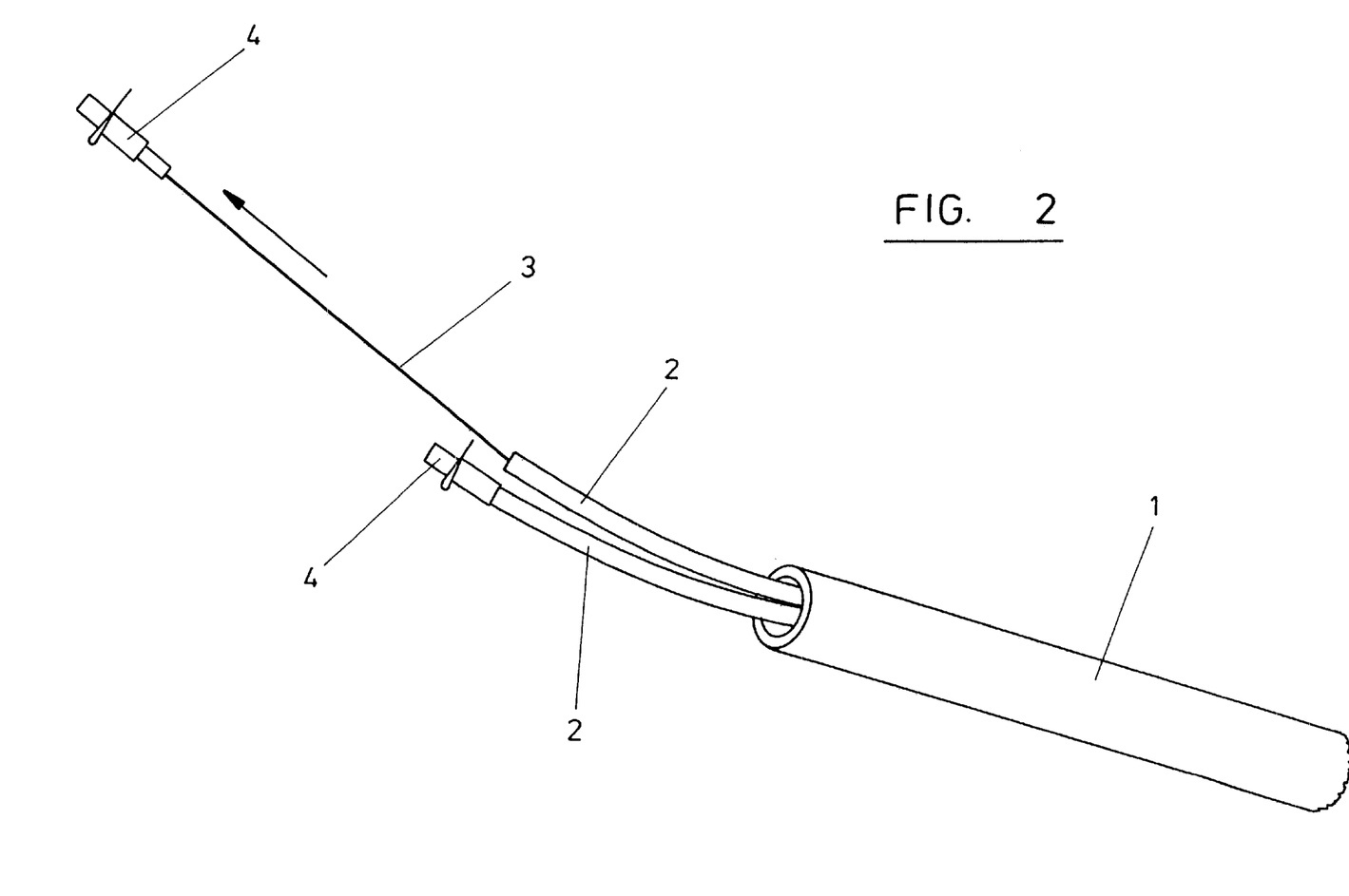
FIG. 2 is an enlarged view of an end of a tube containing two ducts for receiving respective fibre optic members by means of the apparatus of FIG. 1.

Referring firstly to FIG. 2, a tube 1 into which a bundle of optical fibres (not shown) is to be installed comprises two ducts 2, in each of which a pull cord 3 is installed during manufacture. The pull cord 3 is formed from smooth polyester fibres coated in low friction coating, and is braided in a torsionally symmetrical manner to have depressions in the surface thereof to increase fluid drag on the pull cord 3 caused by air flowing over the surface of the cord 3. Each pull cord 3 is attached at each of its ends to a plug 4 which blocks the end of the corresponding duct 2 prior to use. The pull cord 3 is slightly longer than the corresponding duct 2 so that the slack cord 3 can be pulled out of the end of the duct 2.

Figure 1:
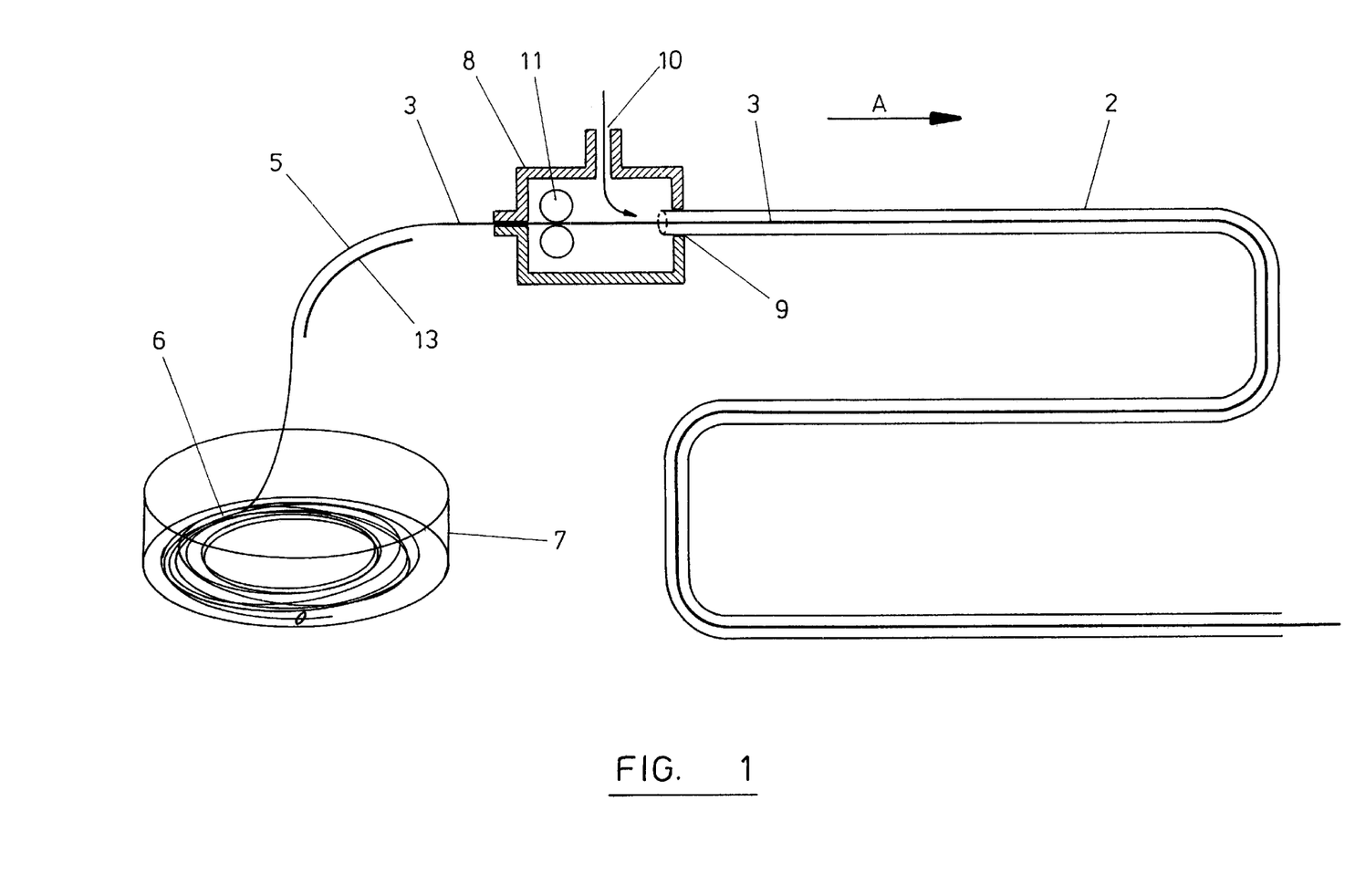
FIG. 1 is a schematic diagram of an apparatus for installing optical fibre in a duct by a method embodying the present invention.

Referring now to FIG. 1, in order to install an unreinforced fibre optic member 5 into a duct 2, the plug 4 is removed from the end of duct 2 remote from the end at which the fibre optic member 5 is to enter the duct 2. The pull cord 3 is removed from the other plug 4 at the other end of the duct 2, and the slackness in the pull cord 3 enables a joint to be made between the end of the cord 3 and the end of the unreinforced optical fibre 5 which is to be installed in the duct 2. The optical fibre 5 is held in a horizontal coil 6 in a fibre pan 7 in a manner which will be well known to persons skilled in the art.

Prior to attachment to the end of the optical fibre 5, the end of the pull cord 3 is passed through a pressurised air blowing head 8. Such a blowing head is described in detail in EP-A-0108590, the entire disclosure of which is incorporated herein by reference. The blowing head 8 has a port 9 to which the end of the duct 2 is mounted, and an air inlet 10 at which pressurised air at a pressure of generally 10 bar is fed to pressurise the duct 2. This causes air to flow along the duct 2, which in turn exerts a fluid drag force on the pull cord 3 in the direction of arrow A shown in FIG. 1.

The pull cord 3 is passed between a pair of drive rollers 11 which feed the pull cord 3 and optical fibre 5 in the direction of arrow A. The drive rollers 11 can be controlled by a suitable device (not shown) to stop driving the optical fibre 5 if slackness in the optical fibre 5 downstream of the blowing head 8 is detected. Alternatively, or in addition, the drive rollers 11 may include a clutch (not shown) which serves to regulate the movement of the optical fibre 5 along the duct 2 by limiting the speed of movement of the fibre 5.

Figure 3A:
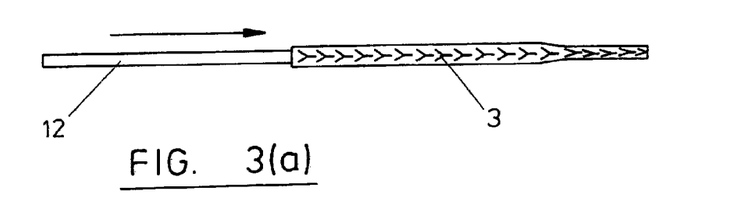
FIGS. 3(a) to 3(f) are elevational views showing the formation of a joint between an optical fibre and a pull cord of the apparatus of FIG. 1.
Figure 3B:
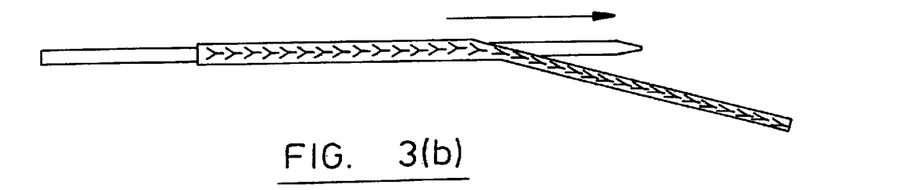
Figure 3C:
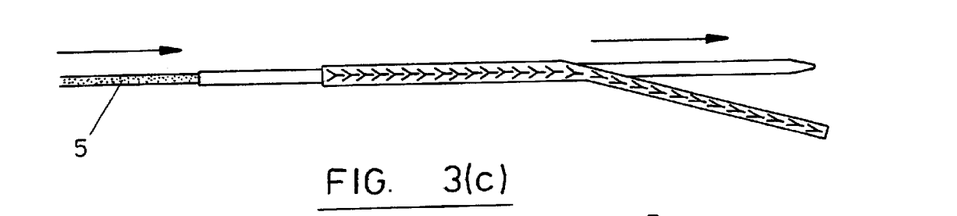
Figure 3D:
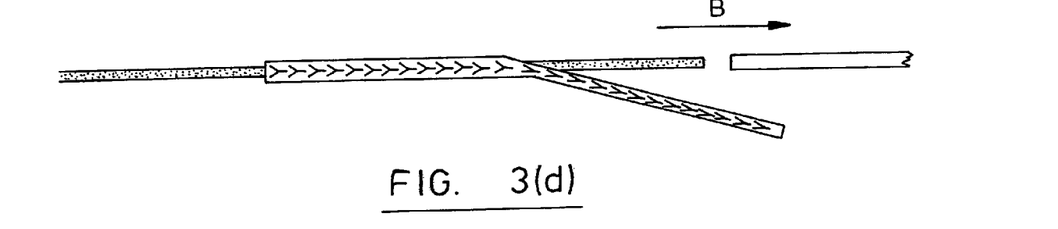
Figure 3E:
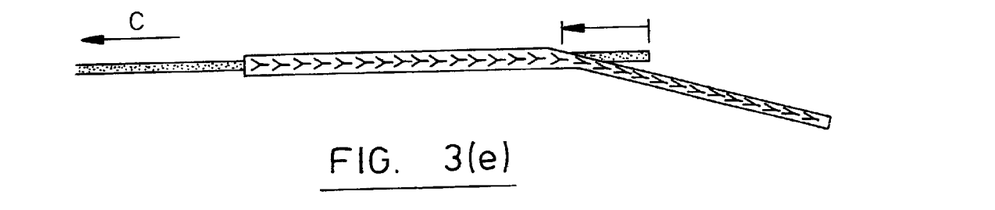
Figure 3F:
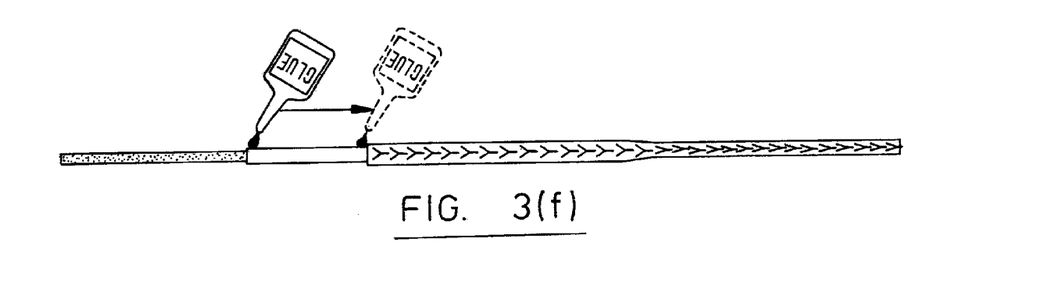

Referring now to FIG. 3(a), in order to form a joint between the pull cord 3 and the optical fibre 5, a needle-like tube 12 is pushed inside the end of the pull cord 3 for a distance of 12 cm to 17 cm. The tube 12 is pushed out through the side of the pull cord 3 (FIG. 3(b)), and the end of the optical fibre 5 is then pushed fully into the tube 12 as shown in FIG. 3(c). The tube 12 is then removed in the direction of arrow B as shown in FIG. 3(d) leaving the end of the optical fibre 5 in place inside the pull cord 3. The end of the optical fibre 5 is then pulled in the direction of arrow C (FIG. 3(e)) until it is just fully inside the pull cord 3, and glue is applied to approximately the last 5 cm of the pull cord 3, as shown in FIG. 3(f).

Referring again to FIG. 1, when the fluid drag of the air flow causes the pull cord 3 to move along the duct 2, the end of the optical fibre 5 is pulled around guide 13 and through the blowing head 8 into the duct 3. As a result, the optical fibre itself experiences fluid drag forces and also moves along the duct 2 in the direction of arrow A until the optical fibre member 5 is fully installed in the duct 2.

Figure 4:
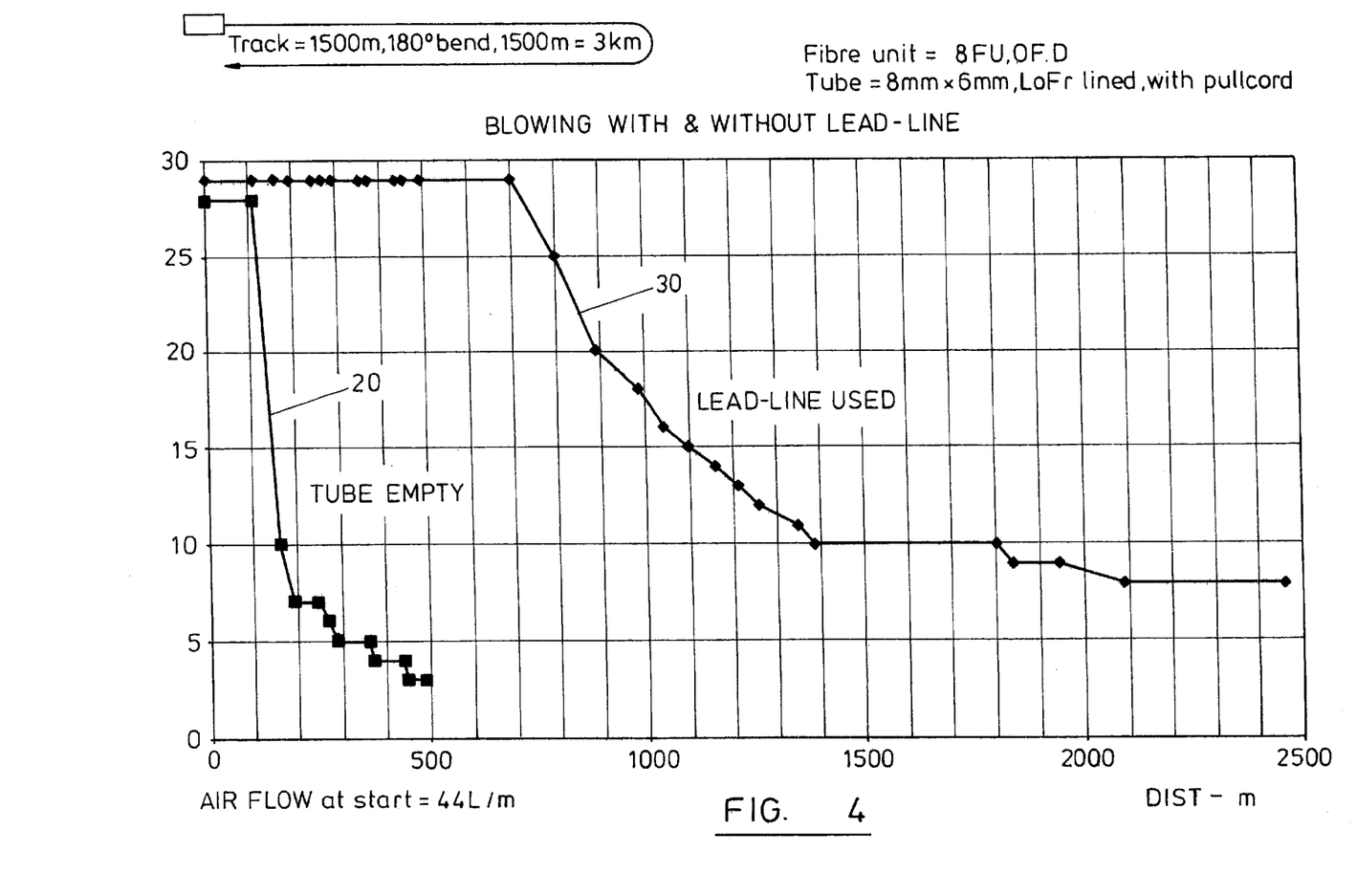
FIG. 4 is a graph of speed of travel of the fibre optic member of FIGS. 1 and 2 against distance of travel of the member along the tube.

As can be seen from FIG. 4, curve 20 shows the relationship between the speed of an optical fibre 5 and the distance that the optical fibre has been blown along a duct 2 in the absence of a pull cord 3 attached to the fibre 5. As is clearly demonstrated by curve 20, the speed of the fibre in the duct rapidly decreases after the fibre has been blown for about 100 meters, and it is found that there is no significant movement of the fibre beyond about 500 meters.

Curve 30, on the other hand, shows that with the method of the present invention, there is no significant decrease in speed of travel of the fibre 5 along the duct 2 until the fibre has been blown about 700 meters, and there is still appreciable movement of the fibre 5 after it has been blown about 2,500 meters. It can therefore be seen that with the method of the present invention, considerably greater lengths of fibre can be installed and at higher rates than in the case of the prior art.

Figure 5:
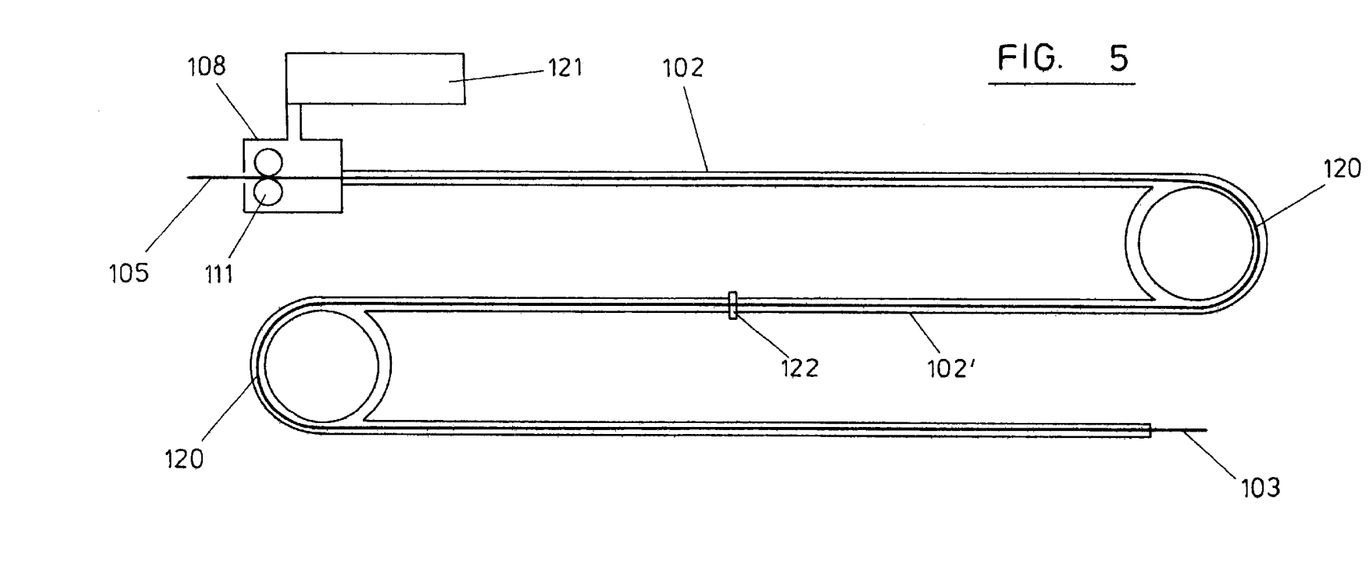
FIG. 5 is a schematic diagram of an apparatus for installing optical fibre into successive lengths of duct arranged in series by a method embodying the present invention.
Figure 5A:
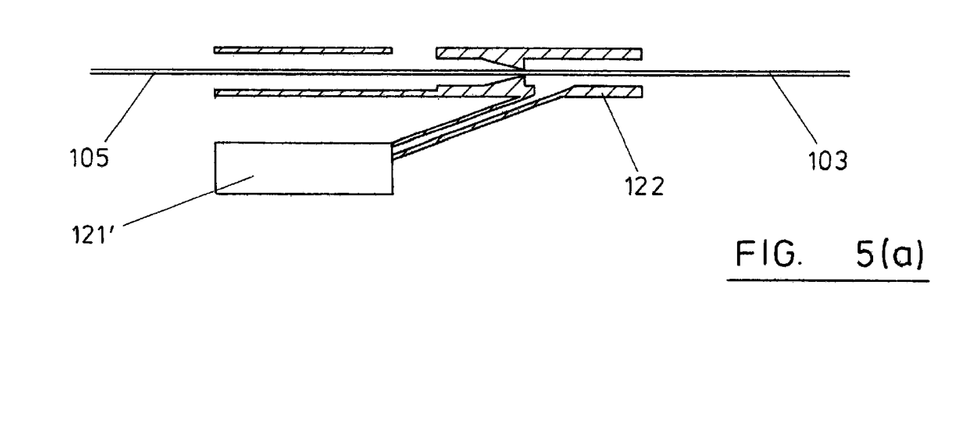
FIG. 5(a) is a schematic view of a connector between adjacent lengths of tube in the apparatus of FIG. 5.

With reference to FIG. 5, in which parts common to the embodiment of FIG. 1 are denoted by like reference numerals but increased by 100, an optical fibre 105 is installed into a tube comprising a pair of lengths of duct 102, 102' connected together by means of a connector 122. A pull-cord 103 pre-installed in the first length of duct 102 is attached to the forward end of the optical fibre 105 by means of the method disclosed with reference to FIG. 3, and the fibre 105 and pull-cord 103 are inserted into the first length of duct 102 by means of a blowing head 108 and air compressor 121 having an air filter and air drying means (not shown) in accordance with the method described with reference to FIG. 1. A further air compressor 121' is connected to an inlet of the connector 122.

After the fibre 105 has been installed in the first length of duct 102, the pull-cord 103 is removed from the leading end of the fibre 105, and the leading end of the fibre 105 is threaded through the connector 122.

Figure 6:
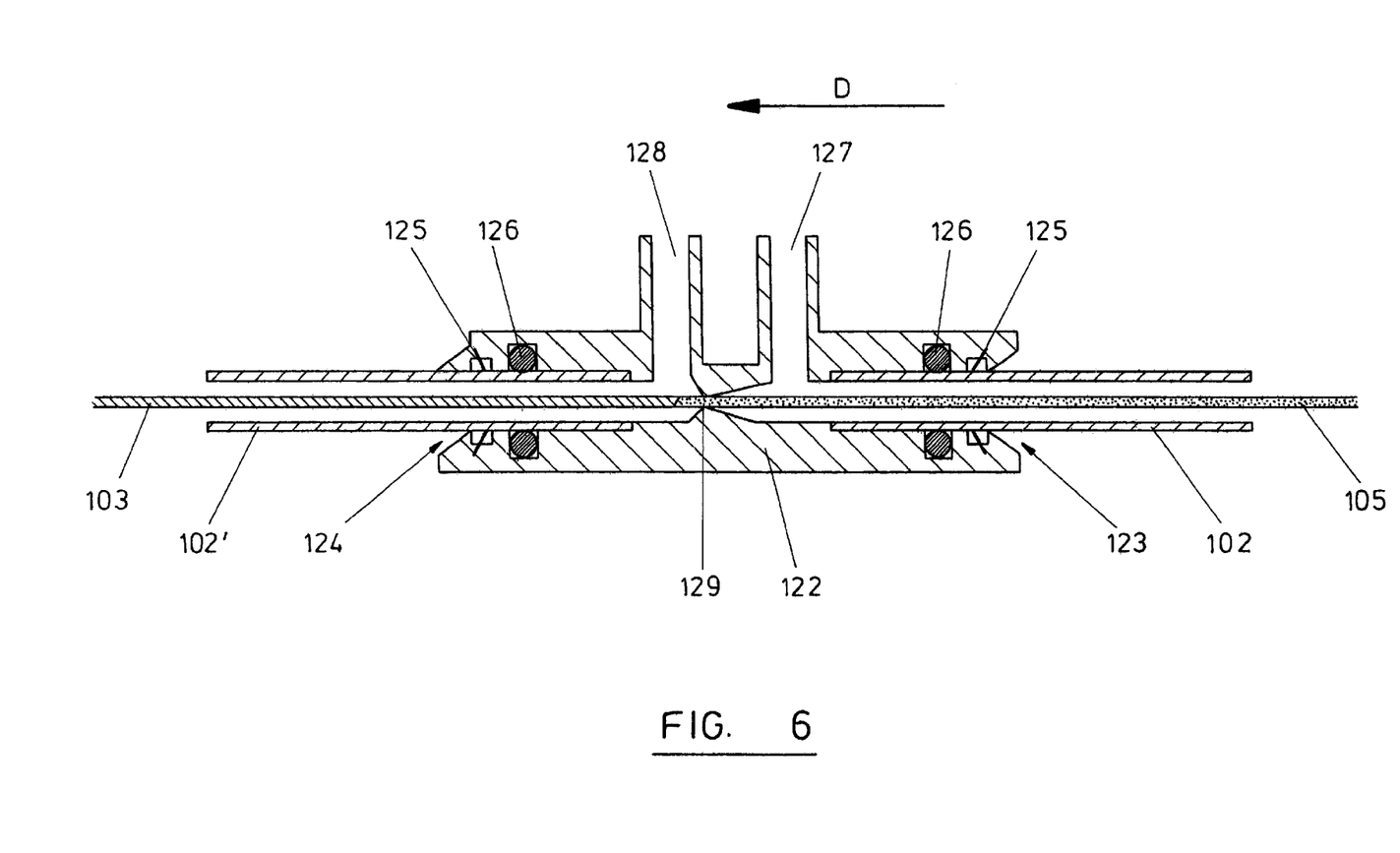
FIG. 6 is a detailed cross-sectional elevation view of a further embodiment of the connector of FIG. 5(a).

As shown in greater detail in FIG. 6, the connector 122 has a moulded body of plastics material having an inlet 123 for receiving the forward end of the first length of duct 102, and an outlet 124 for receiving the rear end of the next length of duct 102'. The inlet 123 and outlet 124 each have a metal grab ring 125 for resisting removal of the corresponding length of duct 102, 102', and a rubber 'O' ring 126 for making a sealing connection therewith.

The connector 122 has an outlet 127 for allowing air passing along the first length of duct 102 from the first compressor 121 to be vented to atmosphere, and an inlet 128 for allowing entry of compressed air from the second compressor 121' into the second length of duct 102'. The outlet 127 and inlet 128 are connected by means of a seal 129 having a hole of sufficient size to allow passage of the optical fibre 105 from the first to the second length of duct in the direction of arrow D in FIG. 6, while preventing air from the second compressor 121' escaping to atmosphere via outlet 127.

Subsequently to threading of the leading end of the fibre 105 through the connector 122, the leading end of the first length of duct 102 is inserted into the inlet 123 of the connector 122, where it is locked in place by the metal grab ring 125 and is sealed with the plastic body of the connector 122 by means of the 'O' ring 126.

The second length of duct 102' is provided with a preinstalled pull-cord 103', which is then connected to the leading end of the optical fibre 105 by means of the methoddescribed with reference to FIG. 3. Any surplus pull-cord 103' is then inserted into the second length of duct 102', and the rear end of the duct 102' as shown in FIG. 6 is inserted into the outlet 124 of the connector 122.

The second compressor 121', together with air filter and air drying means (not shown) is connected to the inlet 128 on the connector 122, and is then switched on to enable air flow along the second length of duct 102' to be established.

It is then possible to see surplus pull-cord 103' emerge from the forward end of the second length of duct 102', and the first compressor 121 (previously used to blow the optical fibre 105 into the first length of duct 102) is switched on to enable air to flow along the first length of duct 102 and out of the outlet 127.

When air flow has been established in the two lengths of duct 102, 102', drive rollers 111 on the blowing head 108 are activated so that installation is terminated when the optical fibre 105 has been inserted into both lengths of duct 102, 102'. It will be appreciated by persons skilled in the art that by means of this process, optical fibre 105 can be installed into an almost infinite number of further sections of duct 102' by repeating this process, thus greatly increasing the distance over which the optical fibre can be installed.

When installation of the optical fibre 105 is complete, the connector 122 can either be removed, or left in situ, in which case the outlet 127 and inlet 128 are closed by means of suitable seals (not shown). Since the connector 122 is a relatively inexpensive component, and may even be less expensive than existing assemblies for closing the ends of ducts 102, leaving the connector in situ avoids the necessity of a separate component to subsequently seal the ends of the lengths of duct 102, 102' and provide long term protection for the optical fibre 105.

Because the optical fibre 105 passing through the connector 122 experiences a tension in the direction of arrow D in FIG. 6 caused by fluid drag on the pull-cord 103', any tendency of the pressurised air to push the optical fibre 105 backwards out of the connector 122 is overcome. Because the connector 122 does not require any drive rollers 111, it can be manufactured relatively inexpensively and in a compact and lightweight manner compared with prior art devices. This is extremely useful in situations in which tubes are installed above ground, for example on poles. In such applications, the compressor 121' can be located at ground level and is connected to the corresponding connector 122 by means of a suitable length of small diameter tube.

It will be appreciated by persons skilled in the art that the above embodiment has been described by way of example only, and not in any limitative sense, and that various alterations and modifications are possible without departure from the scope of the invention as defined by the appended claims.

For example, the connector 122 may be split along its centre line and held together by means of clips or screws and sealed with rubber gaskets to enable the connector to be removed from the optical fibre 105 after installation thereof. In addition, compressed gas provided in a cylinder may be used to provide fluid flow, rather than compressors 121, 121'. In addition, the body of the connector 122 could be manufactured from other materials, such as aluminum or steel, or from a combination of different materials. Furthermore, although the above embodiments have been described with reference to unreinforced optical fibres, the invention could also be applied to reinforced or lightly reinforced fibre optic cables.

In addition, the outlet 127 and inlet 128 of the embodiment of FIG. 6 have been shown as extending generally transversely to the axis of the connector 122. It is possible to minimise any tendency of the air flow to move the optical fibre 105 away from the axis of the connector by replacing outlet 127 by a series of outlets arranged circumferentially about the connector axis. Similarly, inlet 128 can be replaced by a series of circumferentially arranged inlets. Also, the optical fibre 105 may be installed in the first length of duct 102 by conventional means, i.e. by means other than the method described with reference to FIG. 1.

What is claimed is:

1. A method of inserting an elongate, flexible, light transmitting member into an elongate duct, the method comprising:
    inserting an elongate, flexible, tensile member into the duct;
    attaching the tensile member adjacent a rearward end thereof to the light transmitting member adjacent a forward end thereof;
    introducing the forward end of the light transmitting member into the duct; and
    causing flow of fluid along the duct to cause the tensile member to move along the duct and the light transmitting member to move into the duct, wherein the tensile member in use is caused to move along the duct solely by said flow of fluid.

2. A method according to claim 1, wherein the fluid comprises air and/or pressurised gas.

3. A method according to claim 1, wherein the fluid is a liquid.

4. A method according to claim 1, wherein the tensile member is inserted into the duct prior to positioning of the duct at a location at which the light transmitting member is to be inserted therein.

5. A method according to claim 4, wherein the tensile member is installed in the duct during manufacture thereof.

6. A method according to claim 1, wherein the forward end of the light transmitting member is introduced into the duct by means of control means for controlling the speed of the light transmitting member.

7. A method according to claim 1, wherein the forward end of the light transmitting member is introduced into the duct by means of a drive mechanism.

8. A method according to claim 1, further comprising the step of controlling the speed of the light transmitting member in response to slackness in the light transmitting member.

9. A method according to claim 1, wherein the tensile member has a relatively low coefficient of friction with the internal wall of the duct.

10. A method according to claim 9, wherein the tensile member comprises fibres coated with a low friction material.

11. A method according to claim 1, wherein the tensile member has a relatively high coefficient of fluid drag with the flowing fluid in the duct.

12. A method according to claim 1, wherein the tensile member is rotationally symmetrical.

13. A method according to claim 1, wherein the tensile member has a weight per unit length less than that of the light transmitting member.

14. A method according to claim 1, wherein the tensile member comprises at least one optical fibre.

15. A method of inserting an elongate, flexible, light transmitting member into an elongate duct, the method comprising:
    inserting an elongate, flexible, tensile member into the duct wherein the tensile member is attached at one end thereof to a plug adapted to removably block an end of the duct;
    attaching the tensile member adjacent a rearward end thereof to the light transmitting member adjacent a forward end thereof;
    introducing the forward end of the light transmitting member into the duct; and causing a flow of fluid along the duct to cause the tensile member to move along the duct and the light transmitting member to move into the duct, wherein the tensile member in use is caused to move along the duct solely by said flow of fluid.

16. A method of inserting an elongate, flexible, light transmitting member into a plurality of elongate ducts arranged in series, the method comprising:

(a) inserting the light transmitting member into a first length of duct;

(b) feeding the forward end of the light transmitting member through a connector having a first inlet for sealingly receiving a forward end of the first length of duct, a first outlet for allowing escape of fluid flowing along the first length of duct, a second inlet for allowing entry of fluid flowing along a further length of duct, and a second outlet for sealingly receiving a rearward end of the further length of duct;

(c) connecting the forward end of the first length of duct to the first inlet and the rearward end of the further length of duct to the second outlet;

(d) inserting an elongate, flexible, tensile member into the further length of duct;

(e) attaching the tensile member adjacent a rearward end thereof to the light transmitting member adjacent a forward end thereof;

(f) introducing the forward end of the light transmitting member into the further length of duct; and (g) causing flow of fluid along the further length of duct to cause the tensile member to move along the further length of duct and the light transmitting member to move into the further length of duct, wherein the tensile member in use is caused to move along the further length of duct solely by said flow of fluid.

17. A method according to claim 16, wherein a respective tensile member is inserted into each length of duct prior to positioning of the duct at the location at which the light transmitting member is to be inserted therein, and the method further comprises the step of detaching the tensile member of the first length of duct from the light transmitting member after installation thereof in the first length of duct, and attaching the tensile member of said further length of duct to the light transmitting member subsequently to feeding of the forward end thereof through said connector.

18. A method of inserting an elongate, flexible, light transmitting member into a plurality of elongate ducts arranged in series, the method comprising:

(a) inserting the light transmitting member into a first length of duct;

(b) feeding the forward end of the light transmitting member through a connector having a first inlet for sealingly receiving a forward end of the first length of duct, a first outlet for allowing escape of fluid flowing along the first length of duct, a second inlet for allowing entry of fluid flowing along a further length of duct, and a second outlet for sealingly receiving a rearward end of the further length of duct;

(c) connecting the forward end of the first length of duct to the first inlet and the rearward end of the further length of duct to the second outlet;

(d) inserting an elongate, flexible, tensile member into the further length of the duct;

(e) attaching the tensile member adjacent a rearward end thereof to the light transmitting member adjacent a forward end thereof;

(f) introducing the forward end of the light transmitting member to move into the further length of duct;

(g) causing flow of fluid along the further length of duct to cause the tensile member to move along the further length of duct and the light transmitting member to move into the further length of duct, wherein the tensile member in use is caused to move along the further length of duct solely by said flow of fluid; and (h) inserting the light transmitting member into a plurality of further lengths of duct by repeating steps (b) to (g) for each further length of duct.

19. A method of inserting an elongate, flexible, light transmitting member into a plurality of elongate ducts arranged in series, the method comprising:

(a) inserting the light transmitting member into a first length of duct;

(b) feeding the forward end of the light transmitting member through a connector having a first inlet for sealingly receiving a forward end of the first length of duct, a first outlet for allowing escape of fluid flowing along the first length of duct, a second inlet for allowing entry of fluid flowing along a further length of duct, and a second outlet for sealingly receiving a rearward end of the further length of duct wherein said connector comprises at least two parts to facilitate removal thereof from the first and further lengths of duct;

(c) connecting the forward end of the first length of duct to the first inlet and the rearward end of the further length of duct to the second outlet;

(d) inserting an elongate, flexible, tensile member into the fiber length of the duct;

(e) attaching the tensile member adjacent a rearward end thereof to the light transmitting member adjacent a forward end thereof;

(f) introducing the forward end of the light transmitting member to move into the further length of duct;

(g) causing flow of fluid along the further length of duct to cause the tensile member to move along the further length of duct and the light transmitting member to move into the further length of duct, wherein the tensile member in use is caused to move along the further length of duct solely by said flow of fluid.

20. A method of inserting an elongate, flexible, light transmitting member into a plurality of elongate ducts arranged in series, the method comprising:

(a) inserting the light transmitting member into a first length of duct;

(b) feeding the forward end of the light transmitting member through a connector having a first inlet for sealingly receiving a forward end of the first length of duct, a first outlet for allowing escape of fluid flowing along the first length of duct, a second inlet for allowing entry of fluid flowing along a further length of duct, and a second outlet for sealingly receiving a rearward end of the further length of duct;

(c) connecting the forward end of the first length of duct to the first inlet and the rearward end of the further length of duct to the second outlet;

(d) inserting an elongate, flexible, tensile member into the further length of the duct;

(e) attaching the tensile member adjacent a rearward end thereof to the light transmitting member adjacent a forward end thereof;

(f) introducing the forward end of the light transmitting member to move into the further length of duct;

(g) causing flow of fluid along the further length of duct to cause the tensile member to move along the further length of duct and the light transmitting member to move into the further length of duct, wherein the tensile member in use is caused to move along the further length of duct solely by said flow of fluid; and (h) scaling the first outlet and second inlet of said connector subsequently to insertion of the light transmitting member.

21. A method of inserting an elongate, flexible, light transmitting member into a plurality of elongate ducts arranged in series, the method comprising:

(a) inserting the light transmitting member into a first length of duct;

(b) feeding the forward end of the light transmitting member through a connector having a first inlet for sealingly receiving a forward end of the first length of duct, a first outlet for allowing escape of fluid flowing along the first length of duct, a second inlet for allowing entry of fluid flowing along a further length of duct, a second outlet for sealingly receiving a rearward end of the further length of duct, and an aperture so sized as to permit movement of the light transmitting member from the first inlet to the second outlet, but not passage of fluid from the second inlet to the first outlet;

(c) connecting the forward end of the first length of duct to the first inlet and the rearward end of the further length of duct to the second outlet;

(d) inserting an elongate, flexible, tensile member into the further length of the duct;

(e) attaching the tensile member adjacent a rearward end thereof to the light transmitting member adjacent a forward end thereof;

(f) introducing the forward end of the light transmitting member to move into the further length of duct;

(g) causing flow of fluid along the further length of duct to cause the tensile member to move along the further length of duct and the light transmitting member to move into the further length of duct, wherein the tensile member in use is caused to move along the further length of duct solely by said flow of fluid.

* * * * *